United States Patent [19]

Rahman

[11] Patent Number: 5,187,401
[45] Date of Patent: Feb. 16, 1993

[54] COMBINATION HYSTERESIS-RELUCTANCE-PERMANENT-MAGNET MOTOR

[76] Inventor: M. Azizur Rahman, 19 Johnson Crescent, St. John's, Newfoundland, Canada

[21] Appl. No.: 632,892

[22] Filed: Dec. 24, 1990

[30] Foreign Application Priority Data

Dec. 27, 1989 [CA] Canada ............................. 2006647

[51] Int. Cl.$^5$ ............................................ H02K 21/12
[52] U.S. Cl. .................................... 310/156; 310/106; 310/DIG. 2; 318/701
[58] Field of Search ............... 318/701; 310/152, 156, 310/105, DIG. 2, 162, 163, 168, 106, 254, 261

[56] References Cited

U.S. PATENT DOCUMENTS

| | | |
|---|---|---|
| 2,041,875 | 5/1936 | Stoller . |
| 2,328,743 | 9/1943 | Roters . |
| 2,468,295 | 4/1949 | Hush . |
| 2,784,331 | 3/1957 | Rodemann .......................... 310/162 |
| 2,806,158 | 9/1957 | Emery ........................... 310/DIG. 2 |
| 3,007,098 | 10/1961 | Skrobisch . |
| 3,164,735 | 1/1965 | Lichowsky . |
| 4,433,260 | 2/1984 | Weisboard .................... 310/DIG. 2 |

FOREIGN PATENT DOCUMENTS

0122362 10/1946 Australia .

OTHER PUBLICATIONS

"Electric Motors & Electronic Motor Techniques", by J. M. Gottlieb; 1st Ed.; 1976; Howard W. Sams & Co., Inc.; The Bobs-Merrill Co. Inc.; Indianapolis, Kansas City, New York; p. 17.
M. A. Rahman et al., Effects of Samarium Colbalt Permanent Magnet on the Performance of Polyphase Hysteresis-Reluctance Motors, IEEE Transactions on Magnetics, vol. MAG-20, No. 5, Sep. 1984, pp. 1765-1767.
G. R. Slemon, et al., Performance Predictions for Large Hysteresis Motors, IEEE Transactions on Power Apparatus and Systems, vol. PAS-96, No. 6, Nov./Dec. 1977, Annals No. 711PA023, pp. 1915-1919.
M. A. Rahman et al., Transient Performance Analysis of Polyphase Hysteresis-Reluctance Motors, Electric Machines and Power Systems, 9:231-239, 1984.
M. A. Rahman et al., Steady-State Performance Analysis of Polyphase Hysteresis-Reluctance Motors, IEEE Transactions on Industry Applications, vol. 1A-21, No. 4, May/Jun. 1985, pp. 659-663.
M. A. Rahman et al., High Efficiency Permanent Magnet Synchronous Motors, IAS79:16E, pp. 561-564 (no month) 1979.
M. A. Rahman, et al., Performance Analysis of Single--Phase Permanent Magnet Motors, Electric Energy Conference 1987, Adelaide, Oct. 6-9, 1987.
M. A. Rahman, et al., Parameter Sensitivity Analysis for Line-Start Permanent Magnet Motors, Electric Machines and Power Systems, 14:195-212, 1988.
M. A. Rahman, et al., Dynamic Performance Prediction of Hysteresis Motors, IEEE 1969.
A. M. Osheiba, Stability of Interior Permanent Magnet Synchronous Motors, Electric Machines and Power Systes, 16:411-430, 1989.

*Primary Examiner*—R. Skudy
*Attorney, Agent, or Firm*—Richard V. Westerhoff

[57] ABSTRACT

An improved electric motor has a stator, and a hysteresis cylindrical ring formed of magnetic metallic material disposed within the stator cylindrical core with an annular air space between the hysteresis cylindrical ring and the stator core, and a rotor cylindrical sleeve formed of non-magnetic material relatively rotatably mounted within the hysteresis cylindrical ring on a suitable shaft. The improvement includes several interrelated elements. Firstly, the hysteresis cylindrical ring has four longitudinal, generally-rectangular slots spaced 90° apart, and extending from an inner surface of the hysteresis cylindrical ring. Secondly, a permanent magnet is provided only in each of the slots. Thirdly, the rotor cylindrical sleeve has 4 longitudinally-extending, non-magnetically-retentive projections thereon, the projections being spaced 90° apart. The rotor cylindrical sleeve thereby provides longitudinally-extending, annular air duct in each of the 4 sections. This provides an improved 4-pole combination hysteresis-reluctance-permanent-magnet electric motor.

10 Claims, 1 Drawing Sheet

COMBINATION HYSTERESIS-RELUCTANCE-PERMANENT-MAGNET MOTOR

BACKGROUND OF THE INVENTION (i) Field of the Invention

This invention relates to a permanent magnet hysteresis motor.

(ii) Description of the Prior Art

Electric motors containing magnets are well-known in the art.

Attempts have been made to employ permanent magnets instead of wire-wound direct current source for the excitation of synchronous machines. Previous efforts were somewhat unsuccessful for two major reasons. One reason was the unavailability of high coercive-force permanent magnets, while another reason was relatively higher per unit cost. The former is perhaps no longer applicable now because of the availability of high energy modern permanent magnets, e.g., ferrites, manganese-aluminum-carbon, samarium-cobalt, neodymium-boron-iron, etc.

The permanent magnet synchronous motor when connected to a balanced a.c. supply, will run up to synchronous speed, using its rotor cage windings for the starting torque purpose. During run-up period, the time-average motor torque has two components, namely the induction cage-torque and the permanent magnet brake-torque, which are mutually opposing in nature. When the motor attains synchronous speed the cage-torque reduces to zero, while the magnet-torque reverses its role and become the principal motor torque.

The stator of a permanent magnet synchronous motor is structurally similar to that of any conventional synchronous machine. The rotor has permanent magnets instead of wire-wound fields and its associated slip-ring and brush gears. Usually the rotor has squirrel-cage winding which provides the starting torque. The squirrel-cage-winding also acts as a preventive shield against the demagnetization of the permanent magnet due to armature reaction during run-up period. It also does provide the usual damping function against hunting. The power factor efficiency product of squirrel-cage permanent magnet synchronous motors is about 30-40 percent higher than that of induction motors for rating up to about 10 hp.

There are some merits offered by permanent magnet synchronous motors. However, the permanent magnet synchronous motor, when operated at line frequency, has a major drawback during the starting period as the magnets generate a braking torque which decreases the ability of the rotor to synchronize a load. This can be overcome by designing a cage winding having a high resistance to provide sufficient accelerating torque. The motor runs up from rest to near synchronous speed with the help of cage torque, and is then followed by a sudden acceleration into synchronization with the help of both the rotor saliency and magnets. When the motor has reached synchronous speed, the cage torque and its currents are reduced to zero, whereas the magnet torque becomes the sole source of motor torque. However, the rotor cage still provides the function of a damper winding during transient torque disturbances. During run-up, the instantaneous torque produced by such motors has two components, namely, the synchronous average torque and the pulsating torque. The average torque component is comprised of both the cage torque and magnet torque while the pulsating torque is comprised of pulsating cage torque and pulsating magnet torque components.

With recent advancements in magnet materials and solid state devices, there is now scope for large scale application of permanent magnet synchronous motors in variable speed drives. It has, however, been found that the permanent magnet motor becomes unstable when operated at low frequencies or is subjected to sudden changes in operating conditions. The instability is exhibited in the form of rotor oscillation around the mean synchronous speed. Such unstable operation is undesirable since permanent magnet motors are aimed at synchronous operation at all times. Therefore, stability problems emerge in the permanent magnet motor when it is subjected to small disturbances during steady state operation. Forced oscillation may also occur when there is an externally applied torque, voltage or change in one of the machine parameters.

Recent advances in the development of hard magnetic materials have spurred the provision of small and medium-sized brushless synchronous motors. This is, in part, due to changing markets for synchronous a.c. drives and power electronics for applications in computer, textile and glass industries, requiring precisely constant speed combined with smooth starting and braking capability, steady torque, brushless and relatively low noise operation. AC permanent magnet synchronous motors meet these drive constraints. Unlike induction motors, the speed of permanent magnet synchronous motor is uniquely determined by the inverter supply frequency irrespective of voltage, load, temperature and manufacturing variations. These motors are inherently high efficiency types, resulting in greater energy savings. There is no $I^2R$ loss due to slip, as in induction motors. It has also no field losses like those in wire-wound conventional synchronous motors.

Both the permanent magnet synchronous motor and the conventional reluctance type synchronous motor are normally used in multimotor systems requiring synchronized operation from common inverter supply source. However, permanent magnet synchronous motors have several distinct advantages, namely, efficiency, high power factor, and relatively higher stability over the reluctance versions. Smooth brushless operation and simple rotor construction of permanent magnet synchronous motors offer additional advantages particularly for high speed applications.

The higher per unit cost still remains an obstacle for large scale industrial use of synchronous motors. However, the present concern of energy savings overrides the initial per unit higher costs of a synchronous motor. An efficient synchronous motor is cheaper to run over the life of a motor. High efficiency permanent magnet motors with improved power factors are fast catching up in the overall energy savings market. Savings in running a permanent magnet motor is greater than the unit price differential between an induction motor and a permanent magnet synchronous motor.

The hysteresis motor is a well known device. It is widely used in small motor applications. It has simple constructional features with conventional stator windings and a solid rotor hysteresis ring. It has built-in constant torque during the run-up period and it can pull into synchronism any load inertia that it can accelerate. Its starting current is usually less than 180% of the full-load current. Unlike other synchronous motors, it has no preferred synchronizing point and is practically noiseless during operation. These advantages make this motor specially suitable for wide industrial applications and meet the requirements of new adjustable speed drives. As a result, the hysteresis motor is manufactured with new high energy hysteresis materials to improve its performance and rating.

Conventional circumferential-flux-type hysteresis motors are widely used in drives demanding robustness in construction, simplicity in operation, speed constancy, self-starting, high starting and synchronizing torque, low starting current, and low noise. In spite of these advantages, the commercial hysteresis motors still suffer from chronic limitations, e.g. high magnetizing current, low power factor, and low efficiency associated with high parasitic losses. The starting torque of these types of motors is obtained by virtue of the hysteresis effect of the semi-hard permanent magnet material used in the rotor. The maximum torque is dependent on the area of its rotor B-H characteristics. For a fixed excitation, the conventional hysteresis motor torque is constant from start to synchronous speed. Thus the pullout torque is ideally equal to the full-load torque. If the load torque does not exceed the maximum hysteresis torque, the motor runs at synchronous speed in steady state but the angular position of the rotor relative to the stator revolving field is random. On the other hand, a conventional reluctance motor has quite low starting torque but high pullout torque. It also has preferred synchronizing position with respect to the stator revolving field.

The rotor annular ring of a hysteresis motor is normally made of cobalt-steel-type alloys. If such ring can be manufactured as a salient-pole type rotor by designing the rotor to have magnetic saliency with different reluctances on axes mutually at 90° electrical, then the motor would also produce a torque by reluctance motor action in addition to its hysteresis torque. At any speed below the synchronous speed, rotor saliency produces a torque pulsation. When the rotor reaches synchronous speed, it synchronizes in a definite position relative to the stator revolving field. This position is determined by the axes of saliency and load torque. The resultant maximum synchronous torque is the combination of the hysteresis and reluctance effects. Consequently, the pullout torque capacity will be increased when compared to that of the plain hysteresis motor. This type of motor is also known as a polarized hysteresis motor. The unique feature of high starting torque which remains constant up to synchronous speed, makes this hybrid motor particularly suitable for applications in robotics, machine tools, and textile industries, where the precise rotor positioning of the drive is an important requirement.

The hysteresis motors of the prior art, however, have been subject to a number of shortcomings which have limited their application to motors of extremely small power output, for example, of the order of about 1/5000 horsepower, e.g., as are customarily used in synchronous electric clocks. The most important of these shortcomings have been extremely low efficiency, small power output per unit weight and volume, relatively small starting torque, and extremely small synchronizing torque. Certain of these shortcomings can be traced to the fact that it has been generally recognized in the art that hysteresis motors should have a relatively small air gap in order to provide any appreciable starting torque and at the same time avoid the tendency of the motor to lock in at subsynchronous speeds. A large air gap, of course, very materially reduced the magnetic efficiency of the motor.

It is well-known that the hysteresis-reluctance motor produces a torque that is a combination of the hysteresis and reluctance effects. Consequently, the performance characteristics of a hysteresis-reluctance motor would be improved when compared to that of the plain hysteresis motor.

In past designs of hysteresis-reluctance motors, the saliency of the rotor was created by cutting symmetrical slots in the outer surface of the rotor. This, however, caused tooth ripple harmonics, due to the variation of the air gap reluctance. These effects contributed additional flux parasitic losses and noise.

It had been proposed to avoid the last-mentioned disadvantage by decreasing the air gap of the motor to the minimum permitted by manufacturing tolerances and making it uniform throughout the periphery of the rotor and providing a polyphase rotating field of uniform intensity and constant angular velocity by means of a polyphase or split-phase distributed winding, the space-phase displacement of which is equal to the time-phase displacement of its excitation. However, it had been found that, while this relationship would be optimum for an ideal motor having a perfectly sinusoidal flux distribution, as a practical matter the reduction of the air gap below a definite value actually reduced both the starting torque and the running torque of the parasitic hysteresis losses developed by the harmonic flux components due to the armature teeth and slots. These parasitic hysteresis losses increase rapidly as the air gap is decreased. The synchronous hysteresis motors of the prior art have also been subject to the disadvantage that they have had extremely small synchronizing torques, both pull-in torque and pull-out torque.

U.S. Pat. No. 2,041,875 patented May 26, 1936 by H. M. Staller provided a hysteresis synchronous motor having a number of stator windings producing different numbers of poles and a cylindrical shell rotor operating at substantially maximum permeability that shall rotate at a number of synchronous speeds upon selective energization of the stator windings. The patentee provided a slow speed motor adapted to operate at a plurality of synchronous speeds. It included a stator having a slotted core and a plurality of windings wound for different numbers of poles. The rotor included a continuous, symmetrical ring of magnetic material, the windings being disposed in the stator slots at different depths and the thickness of the rotor magnetic material being such as to obtain optimum flux density in the rotor and maximum torque by the motor when either winding is energized. Electrical means shifted the synchronous speed of the rotor at will by energizing any desired stator winding.

U.S. Pat. No. 2,328,743 patented Sep. 7, 1943 by H. C. Roters provided self-starting hysteresis motor comprising stator and rotor elements having coaxial cooperating substantially continuous cylindrical surfaces forming a uniform air gap therebetween and means including a symmetrical distributed exciting winding wound on said stator element for developing a rotating field of constant intensity and angular velocity. The rotor element comprised an annular shell of material having a high hysteretic constant and a supporting spider of low remanence high-permeability material having salient poles with cylindrical faces engaging the shell and equal in number to the stator poles. The spider was effective to develop a substantial variable-permanence synchronizing torque.

U.S. Pat. No. 2,468,295 patented Apr. 26, 1949 by J. M. Hush provided a hysteresis type motor adapted for being driven at synchronous speeds for use as clock or timer motors. The patentee provided an electric motor having a magnetic frame including a plurality of spokes. Rings of magnetic material connected the ends of the spokes and defined an annular space. A rotor including magnetically-retentive material was rotatably suspended in that space. Coils were wound around the spokes for establishing a magnetomotive force across the annular space.

U.S. Pat. No. 2,784,331 patented Mar. 5, 1957 by E. P. Nodemann provided an orienting, self-starting synchronous motor including a polyphase stator member and a rotor member. The rotor member included a shaft, a hysteresis starting element floating on the shaft and a permanent magnet element fixed to the shaft. Means coupled the hysteresis element with the permanent magnet element for synchronously positioning the shaft of the rotor in a repeatable close mechanical reference to the rotating magnetic field vector produced by the stator. The permanent magnetic element had an outside contour to provide two salient poles with no abrupt change in curvature between the poles, thereby providing a large concentration of diametrical flux affording a high degree of orientation.

SUMMARY OF THE INVENTION (i) Aims of the Invention

Nevertheless, none of these prior proposals have solved the problems outlined above. It is an object, therefore, of the present invention, to provide an improved permanent magnet hysteresis motor which is capable of overcoming one or more of the abovementioned disadvantages of such motors of the prior art.

It is another object of the present invention to provide an improved permanent magnet, hysteresis-reluctance motor in order to benefit from one or more of the following advantageous characteristics: high efficiency; high power output per unit weight and volume; high starting torque; and high synchronizing torque, and which will at the same time be relatively economical of construction.

Another object of this invention is to provide an improved permanent magnet, a hysteresis-reluctance motor electrode which provides the advantages of a hysteresis motor electric namely robustness of construction, simplicity in operation, speed consistency, self-starting, high starting and synchronizing torque, low starting current and low noise without suffering the above described disadvantages of low power factor and low efficiency associated with high parasitic losses.

(ii) Statement of Invention

By this invention, an improvement is provided in an electric motor having a stator, a hysteresis cylindrical ring formed of magnetic metallic material disposed within the stator, with an annular air space between the hysteresis cylindrical ring and the stator, and a rotor cylindrical sleeve formed of non-magnetic material relatively rotatably mounted within the hysteresis cylindrical ring on a suitable shaft. The improvement comprises the following: forming the hysteresis cylindrical ring with "p" longitudinal, generally-rectangular slots (where "p" is an even number of at least four) spaced 360/"p"° apart, and extending from an inner surface of the hysteresis cylindrical ring; providing a permanent magnet in each of the slots; and forming the rotor cylindrical sleeve with "p" longitudinally-extending, non-magnetically-retentive projections thereon, the projections being spaced 360/"p"° apart, the rotor cylindrical sleeve providing a longitudinally-extending, annular air duct in each of the "p" sections; thereby providing a "p"-pole, combination hysteresis-reluctance-permanent-magnet electric motor.

By a presently preferred embodiment of this invention, an improvement is provided in an electric motor having a stator, a hysteresis cylindrical ring formed of magnetic metallic material disposed within the stator core, with an annular air space between the hysteresis cylindrical ring and the stator cylindrical core, and a rotor cylindrical sleeve formed of non-magnetic material, relatively rotatably mounted within the hysteresis cylindrical ring on a suitable shaft. The improvement comprises the following: forming the hysteresis cylindrical ring with four longitudinal, generally-rectangular slots spaced 90° apart and extending from an inner surface of the hysteresis cylindrical ring; providing a permanent magnet in each of the slots; and forming the rotor cylindrical sleeve with four longitudinally-extending, non-magnetically-retentive projections thereon, the projections being spaced 90° apart, the rotor cylindrical sleeve providing a longitudinally-extending annular air duct in each of the four sections; thereby providing a four-pole, combination hysteresis-reluctance-permanent-magnet motor.

The annular air space or air gap is preferably about 0.2 mm and the longitudinally-extending air drops are preferably about 5 mm.

Other variants of the motor include a motor in which the slots cover not more than about 60% of the rotor pole pitch, the slots having a selected cross-sectional shape depending on the cross-sectional shape of the magnets. The slots are generally rectangular i.e. square in cross-section. The projections have a pre-selected cross-sectional shape, the projections generally being trapezoidal in cross-section. The magnets are arranged either in radial or in circumferential directions, in alternate polarity opposed against induced opposite polarity of the projections. The hysteresis ring is secured solidly with the rotor sleeve at the projections. The magnets, in a preferred embodiment, are high energy magnets selected from the group consisting of ferrites, magnesium-aluminum-carbon, samarium-cobalt, and neodymium-boron-iron. The hysteresis ring is made of 17% or 36% cobalt-steel, the magnets are NdBFe magnets and the entire rotor sleeve including the projections is made of aluminum. The winding of the stator is preferably sinusoidally distributed. The hysteresis ring should preferably be homogeneous. The magnetic flux should preferably be radial in the air gaps and circumferential in the hysteresis material.

BRIEF DESCRIPTION OF THE DRAWINGS

In the accompanying drawings

FIG. 1 is a transverse cross-section through the core of the conventional hysteresis electric motor of the prior art transverse longitudinally extending at.

Figure 1:
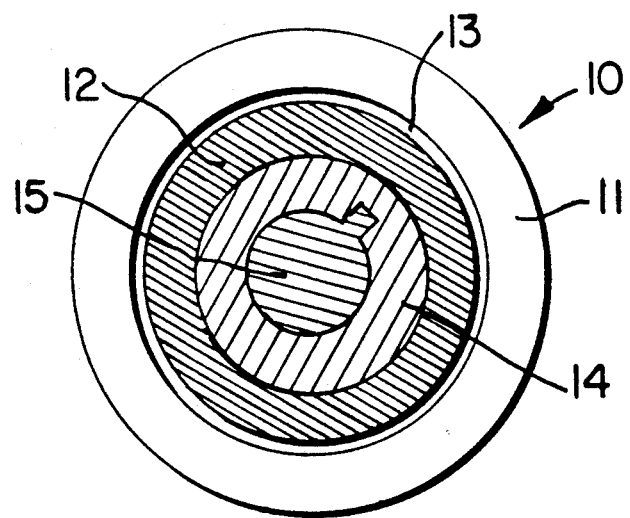

DESCRIPTION OF PREFERRED EMBODIMENT (i) Description of FIG. 1

This Figure shows a electric motor of the prior art. As seen in FIG. 1, a conventional hysteresis electric motor 10 includes a stator 11 with associated stator slots and teeth (not shown), within which is disposed a hysteresis cylindrical ring 12 with an annular cylindrical air gap 13 therebetween. While many hysteresis electric motors are inside-out type for applications in gyroscopes and centrifuges, the hysteresis electric motor over which the present invention is an improvement, is an inside rotor and stationary outside stator type. A non-magnetic cylindrical rotor 14 is relatively rotatably mounted within the hysteresis cylindrical ring 12 on a splined shaft 15.

As is conventional, the hysteresis cylindrical ring of the hysteresis electric motor may be made of many types of alloys, e.g. samarium-cobalt, HICOREX-90 TM, manganese-aluminum-carbon-type alloys, 17% cobalt-steel type alloys or 36–37% cobalt-steel-type alloys. The electric motor has a standard 3-phase, 4-pole stator winding. Such electric motor can typically (in a 200 kW hysteresis electric motor) have an efficiency in excess of about 90% and a power factor in excess of about 70%.

Figure 2:
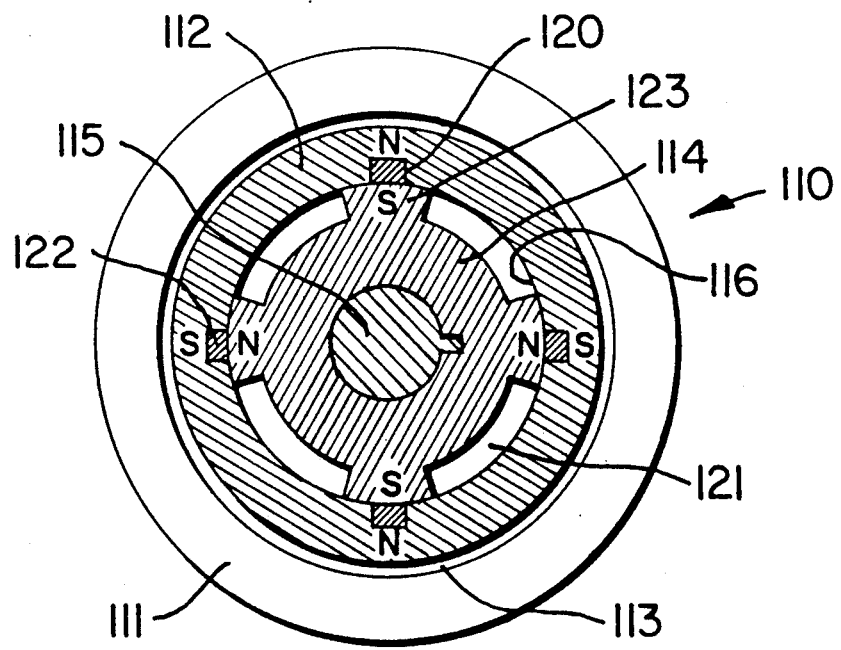
FIG. 2 is a cross-section through the core of a hysteresis-reluctance permanent motor magnet, electric motor according to one embodiment of this invention in which, as is the convention in this art, the windings have been omitted for clarity.

(ii) Description of FIG. 2

As seen in FIG. 2, the combination hysteresis-reluctance-permanent-magnet electric motor 110 of one embodiment of this invention includes a stator 111 within which is mounted a hysteresis cylindrical ring 112 separated therefrom by an annular air gap 113. The hysteresis cylindrical ring 112 is provided with four 90° spaced-apart, generally-rectangular slots 120 extending radially outwardly from the inner circumferential surface 116 of the hysteresis ring 112 covering not more than about 60% of the rotor pole pitch. The longitudinal slots for the magnets are generally rectangular because each standard piece of the shaft of the magnet is rectangular in shape. Other complementary shapes of slots and magnets can, of course, be used for specific magnet shapes. Within each such rectangular-in cross-section slot 120 is a permanent magnet 122, disposed alternately with the North and South poles facing inwardly or circumferentially. This embodiment is a four-pole motor. However, any number of pole-pairs arrangement can be made, making it a "p"-pole motor where, however "p" is restricted to an even number.

A non-magnetic rotor cylindrical sleeve 114 is relatively-rotatably mounted within the core of the hysteresis ring 112 on a splined shaft 115. The rotor cylindrical sleeve 114 is provided with four non-magnetically-retentive projections 123 spaced 90° apart. The material for the projection whether it be extruded or otherwise, is the same as the material of the rotor sleeve, e.g. aluminum. It is non-magnetic for the circumferential rotor-flux motor of an embodiment of this invention. Each projection 123 has a generally-trapezoidal cross-section. Between each projection 123 is a quarto-annular air duct 121. The hysteresis cylindrical ring 112 is secured solidly with rotor sleeve 114 at projection 123 (by means not shown).

In this embodiment, the hysteresis cylindrical ring is made of 36% cobalt-steel, the permanent magnets are NdBFe magnets and the rotor sleeve is made of aluminum.

EXAMPLE

Comparative tests with a conventional hysteresis electric motor (as in FIG. 1), a conventional hysteresis-reluctance electric motor and a combination hysteresis-reluctance-permanent-magnet, electric motor of the present invention (as in FIG. 2) were carried out. A standard stator frame initially used for a three-phase, generalized motor rated at 208 V, four-pole, and 60 Hz was used to hold the respective cores. The motors were tested and loaded by a dc work machine; the torque angle was measured by using a stroboscope and a protractor; the torque was measured by using a torque transducer.

Typical results are shown in the following table:

| | Property | Hysteresis-Reluctance Type | Hysteresis Type |
|---|---|---|---|
| stator input current | $I_1$ (A) | 18.30 | 12 |
| output torque | $T_2$ (Nm) | 8.50 | 4.2 |
| input power | $P_1$ (kW) | 2.30 | 1.35 |

As seen by these typical results, the hysteresis-reluctance-type, electric motor yields results which were superior to those of the pure hysteresis type electric motor. The combination hysteresis-reluctance-permanent-magnet motor of an embodiment of this invention, when tested in the same stator frame gave even more superior results.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. In an electric motor having a stator, a hysteresis cylindrical ring formed of magnetic metallic material disposed within said stator core with an annular air space between said hysteresis cylindrical ring and said stator core, and a rotor cylindrical sleeve formed of non-magnetic material relatively rotatably mounted within said hysteresis cylindrical ring on a suitable shaft, the improvement comprising: forming said hysteresis cylindrical ring with "p" longitudinally-extending generally-rectangular slots spaced 360/"p"° apart, and extending from an inner, where "p" is an even number of at least four, cylindrical sleeve with "p" longitudinally-extending, non-magnetically-retentive projections thereon, said projections being spaced 360/"p"° apart, said rotor cylindrical sleeve thereby providing a longitudinally-extending, annular air duct in each of "p" sections; thereby providing a "p"-pole, combination hysteresis-reluctance-permanent-magnet electric motor.

2. In an electric motor having a stator, a hysteresis cylindrical ring formed of magnetic metallic material disposed within said stator cylindrical core, with an annular air space between said hysteresis cylindrical ring and said stator cylindrical core, and a rotor cylindrical sleeve formed of non-magnetic material, relatively rotatably mounted within said hysteresis cylindrical ring on a suitable shaft, the improvement comprising: forming said hysteresis cylindrical ring with four longitudinally-extending, generally-rectangular slots spaced 90° apart and extending from an inner surface of said hysteresis cylindrical ring; providing a permanent magnet in each of said slots; and forming said rotor cylindrical sleeve with four longitudinally-extending, non-magnetically-retentive projections thereon, said projections being spaced 90° apart, said rotor cylindrical sleeve providing a longitudinally-extending annular air duct in each of said four sections; thereby providing a four-pole, combination hysteresis-reluctance-permanent-magnet electric motor.

3. The electric motor of claim 2 wherein said slots are generally rectangular in cross-section.

4. The electric motor of claim 2 wherein said projections are generally trapezoidal in cross-section.

5. The electric motor of claim 2 wherein said magnets are arranged in alternate polarity.

6. The motor of claim 2 wherein said hysteresis cylindrical ring is secured solidly with said rotor cylindrical sleeve at said projections.

7. The electric motor of claim 2 wherein said magnets are high energy magnets selected from the group consisting of ferrites, magnesium-aluminum-carbon, samarium-cobalt and neodymium-boron-iron.

8. The electric motor of claim 2 wherein: said slots are substantially-square in cross-section; wherein said projections are generally-trapezoidal in cross-section; wherein said permanent magnets are arranged in alternate polarity and are made of NdBFe; wherein said hysteresis cylindrical ring is made of 17% or 36% cobalt-steel; and wherein the entire said rotor sleeve and said projections are made of aluminum.

9. The electric motor of claim 2 wherein said annular air space is about 0.2 mm thick, and wherein said air ducts are about 5 mm thick.

10. The electric motor of claim 2 wherein said slots are generally square in cross-section.

* * * * *